M. S. DARRIN.
DISH AND KETTLE SCRAPER.
APPLICATION FILED AUG. 13, 1914.
1,211,098.
Patented Jan. 2, 1917.
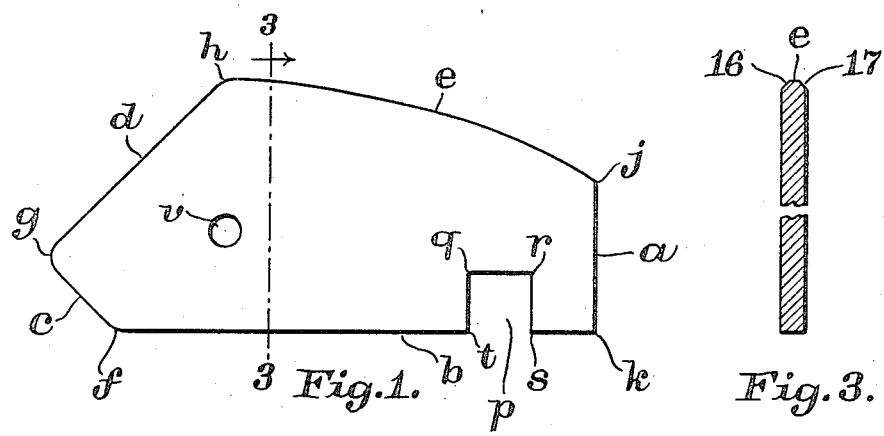
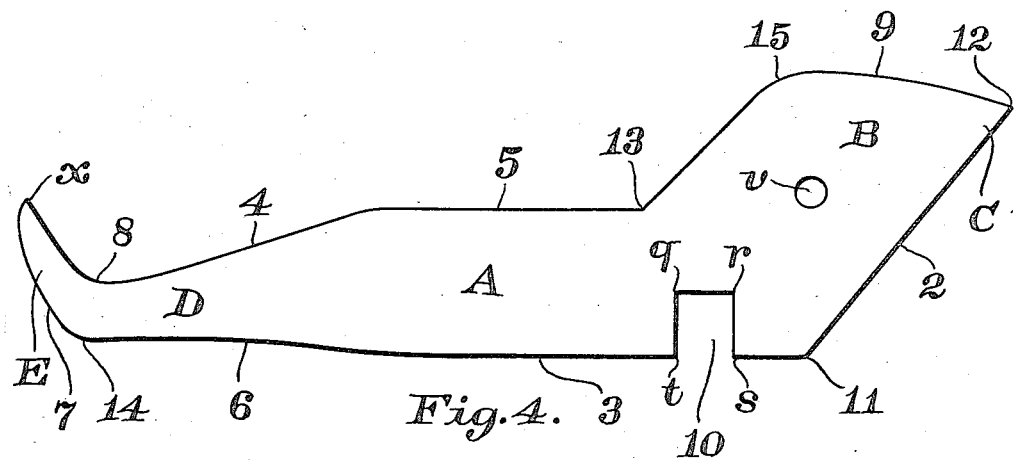

UNITED STATES PATENT OFFICE.

MARY S. DARRIN, OF BROOKLYN, NEW YORK.

DISH AND KETTLE SCRAPER.

1,211,098.　　　　　Specification of Letters Patent.　　Patented Jan. 2, 1917.

Application filed August 13, 1914. Serial No. 856,643.

*To all whom it may concern:*

Be it known that I, MARY S. DARRIN, a citizen of the United States, and a resident of the borough of Brooklyn, county of Kings, city and State of New York, have invented certain new and useful Improvements in Dish and Kettle Scrapers, of which the following is a specification accompanied by drawings.

This invention relates to a new and improved article of manufacture in the form of a dish and kettle scraper constructed of a material which has never heretofore been used for this purpose. Scrapers for domestic use for scraping and cleaning culinary utensils have been made in various shapes of such materials as wood and metal, but metal scrapers not only make an unpleasant sound, but will scratch the glaze on utensils and are apt to rust, while wooden scrapers are soft, absorb water, and warp, and disintegrate in constant use in scalding water. I have discovered that by making the scraper out of a piece of sheet celluloid, all the objections to such an article are removed, and added advantages are provided, because celluloid is not sufficiently hard to scratch the glaze or mar the utensils to be cleaned, but is harder than wood and is hard enough for cleaning purposes. Celluloid forms an admirable material for a culinary scraper, because it does not rust or absorb water and grease, retains no surface film of moisture, it may be used indefinitely in scalding water without warping or disintegration, and no unpleasant sound is produced in the actual scraping operations. The edges and corners of the celluloid article are equally effective against any surface of any material, whether metal, enamel, glazed china, or porcelain.

The invention is illustrated in the accompanying drawings, in which—

Figure 1 is a side view of a scraper; Fig. 2 is an edge view; Fig. 3 is a transverse sectional view on the line 3—3 of Fig. 1 looking in the direction of the arrows; Fig. 4 is a side view of a modification, and Fig. 5 is an edge view of Fig. 4.

Referring to the drawings, the scraper shown in the figures comprises a thin flat piece of sheet celluloid which is cut and formed with straight and curved sides and blunt and sharp corners and is preferably provided with at least one rectangular recess in one side. The modification shown in Fig. 4 is substantially like Fig. 1, except that one end is elongated and cut to form a curved hook-shaped piece.

In Fig. 1 the base $b$ is straight, and is provided with a rectangular recess $p$ therein at one end. This recess $p$ is bounded by three straight edges formed by the base and sides of the recess, and the angles $q$ and $r$ and corners $s$ and $t$ are sharp. The function of the recess is for cleaning the collar around the top of a fruit jar, for instance. The end $a$ adjacent the recess $p$ is straight and forms a sharp right angle with the base $b$ at $k$. The opposite end, at the other end of the base, is formed of two straight edges $c$ and $d$ forming an outward angle having a rounded apex at $g$. The corner $f$ is also preferably rounded. The top $e$ of the scraper joining the ends is outwardly curved and forms a sharp corner $j$ with the straight end $a$. The top $e$ merges with the edge $d$ at $h$. An aperture $v$ is provided for hanging the scraper in convenient position.

The scraper is especially designed for service in the kitchen, although it may be used for removing putty and paint from window panes after repairs have been made.

It is especially useful for removing sticky or burned substances from plates and dishes of all kinds, and for removing refuse from kneading boards. This work is all done with a small expenditure of energy and without the unpleasant metallic squeak that a spoon, or knife or metallic scraper is sure to make.

The celluloid composing my scraper preferably has no taste or color and is absolutely sanitary. It will not rust or corrode, and it cannot scratch or mark the finest china, glass, silver, agate or aluminum ware, as metal scrapers do.

My scraper is designed to have an angle for every corner and an edge for every surface of a dish. By soaking the dishes for a short time in cold water, before using my scraper, I have found that the best results are obtained, and the scraper performs its work satisfactorily and well.

In Figs. 4 and 5, the elongated scraper is provided with a body portion A, a head B having a pointed bill C, and a tail D having a curved hook-shaped end E, which terminates in a point $x$. The edges 2, 3, 4 and 5 are preferably straight, and the remaining edges or portions of edges are preferably curved, as at 6, 7, 8 and 9, and one side is provided with the rectangular recess 10 constructed like the recess shown in Fig. 1. The eye or aperture $v$ is also provided in the head B as in Fig. 1. The corners 11, 12 and 13 are preferably sharp, while the corners 14 and 15 are rounded or blunt, and the sharpness or bluntness and the number of corners and angles may be varied as desired. The angle 13, for instance, is preferably sharp, as indicated.

At least one edge of the device as the edge formed by the sides $d$ and $e$ in Fig. 1 may, if desired, be beveled as shown at 16 and 17, in Fig. 3, and one edge of the device shown in Fig. 4 may also be beveled to facilitate certain cleaning operations and the removal of grease from utensils.

I claim and desire to obtain by Letters Patent the following:

As a new and improved article of manufacture, a dish and kettle scraper, comprising a single thin flat piece of sheet celluloid cut and formed with a straight base having a rectangular recess therein at one end, said recess bounded by three straight edges formed by the base and sides of said recess, the angles and corners of the boundary of said recess being sharp, the end of the scraper adjacent the said recess being straight and forming a sharp right angle with the base, the opposite end of the sheet at the other end of the base being formed of two straight edges forming an outward angle having a rounded apex, and the top of the scraper joining the two ends being outwardly curved and forming a sharp corner with the straight end of the scraper.

In testimony whereof I have signed this specification in the presence of two subscribing witnesses.

MARY S. DARRIN.

Witnesses:
  A. D. WEEKES, Jr.,
  HERBERT G. OGDEN.